US012603677B2

(12) United States Patent
Banerjee et al.

(10) Patent No.: US 12,603,677 B2
(45) Date of Patent: Apr. 14, 2026

(54) COMPOSITE RECONFIGURABLE INTELLIGENT SURFACE SYSTEM FOR REAL TIME BEAM STEERING AND METHOD THEREOF

(71) Applicant: Tata Consultancy Services Limited, Mumbai (IN)

(72) Inventors: Amartya Banerjee, Kolkata (IN); Soumya Chakravarty, Kolkata (IN); Tapas Chakravarty, Kolkata (IN); Rowdra Ghatak, Durgapur (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 53 days.

(21) Appl. No.: 18/903,709

(22) Filed: Oct. 1, 2024

(65) Prior Publication Data

US 2025/0175218 A1 May 29, 2025

(30) Foreign Application Priority Data

Nov. 28, 2023 (IN) ............................. 202321080776

(51) Int. Cl.
*H04B 7/04* (2017.01)
*H04B 7/0426* (2017.01)
*H04W 16/28* (2009.01)

(52) U.S. Cl.
CPC ......... *H04B 7/04013* (2023.05); *H04B 7/043* (2013.01); *H04W 16/28* (2013.01)

(58) Field of Classification Search
CPC .... H04B 7/04013; H04B 7/043; H04W 16/28
See application file for complete search history.

(56) References Cited

U.S. PATENT DOCUMENTS

| | | | |
|---|---|---|---|
| 11,289,817 B2 * | 3/2022 | Somerlock, III .. | H01Q 15/0033 |
| 2005/0122273 A1 * | 6/2005 | Legay ...................... | H01Q 3/46 |
| | | | 343/754 |

(Continued)

FOREIGN PATENT DOCUMENTS

| | | |
|---|---|---|
| CN | 116169480 A | 5/2023 |
| CN | 116706563 A | 9/2023 |

OTHER PUBLICATIONS

Rastogi, Aryan et al., "A Polarization-Insensitive Reconfigurable Intelligent Surface for Beam Steering", IEEE Microwaves, Antennas, and Propagation Conference (MAPCON), Date: 2022, Publisher: IEEE, Link: https://ieeexplore.ieee.org/document/10046978.

*Primary Examiner* — Freshteh N Aghdam
(74) *Attorney, Agent, or Firm* — Finnegan, Henderson, Farabow, Garrett & Dunner, LLP

(57) ABSTRACT

This disclosure relates generally to a composite reconfigurable intelligent surface system for real time beam steering and method thereof. Conventional method for real time beam steering includes bulky systems with several antenna elements and amplifiers to shape and control the beam. The present disclosure provides a composite reconfigurable intelligent surface (CRIS) for real time beam steering. The CRIS is formed from a set of constituent reflecting surfaces which in turn are generated from unit cells. These unit cells are responsible for providing individual phase reflection performance utilizing the installed varactor diode in each unit cell. The CRIS can provide a) multi-beam reflection performance, b) polarization sensitive operation, c) 2D beam steering abilities, d) real-time beam control, e) null point reduction for beam shaping requirements and f) dependable pattern stability over a suitable range of frequencies.

18 Claims, 22 Drawing Sheets

(56) References Cited

U.S. PATENT DOCUMENTS

| | | | |
|---|---|---|---|
| 2022/0059943 A1* | 2/2022 | Saab ................... | H04B 7/0617 |
| 2022/0321198 A1* | 10/2022 | Devoti .............. | H04B 7/04013 |
| 2022/0337240 A1 | 10/2022 | Venkatesh et al. | |
| 2023/0133302 A1* | 5/2023 | Perkins ............... | H04B 7/0617 |
| | | | 342/372 |
| 2024/0171222 A1* | 5/2024 | Capolino ........... | H01Q 15/0066 |
| 2025/0125525 A1* | 4/2025 | Rossanese .......... | H04B 7/0617 |

* cited by examiner

Direction of Phase Variation
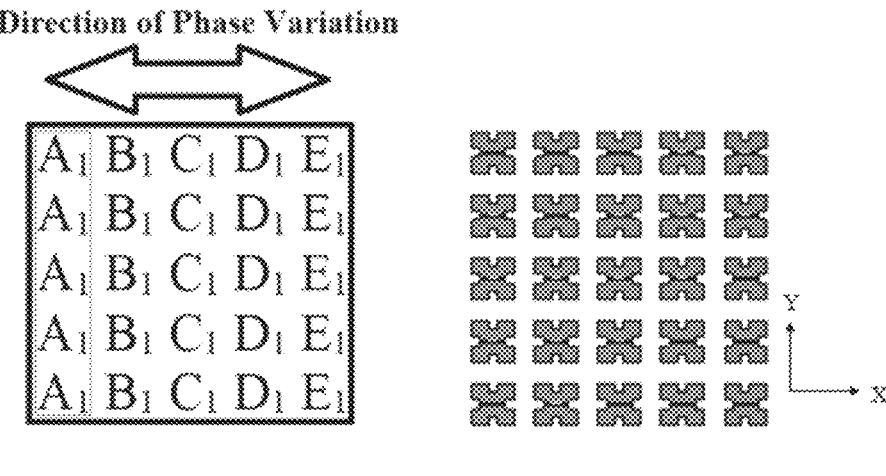
FIG 5A                    FIG 5B

Bistatic Scattering RCS Abs (Phi=0)

Theta / Degree vs. dB(m^2)

Frequency = 3.5 GHz

Main lobe magnitude =  6.71 dB(m^2)

Main lobe direction =  3.0 deg.

Angular width (3 dB) =  17.0 deg.

Side lobe level =  -3.0 dB

Theta / Degree vs. dB(m^2)

Frequency = 3.5 GHz

Main lobe magnitude =     6.72 dB(m^2)

Main lobe direction =    3.0 deg.

Angular width (3 dB) =   17.1 deg.

Side lobe level =   -3.1 dB

Theta / Degree vs. dB(m^2)

Frequency = 3.5 GHz

Main lobe magnitude =   6.84 dB(m^2)

Main lobe direction =   0.0 deg.

Angular width (3 dB) =   19.6 deg.

Side lobe level =  -8.0 dB

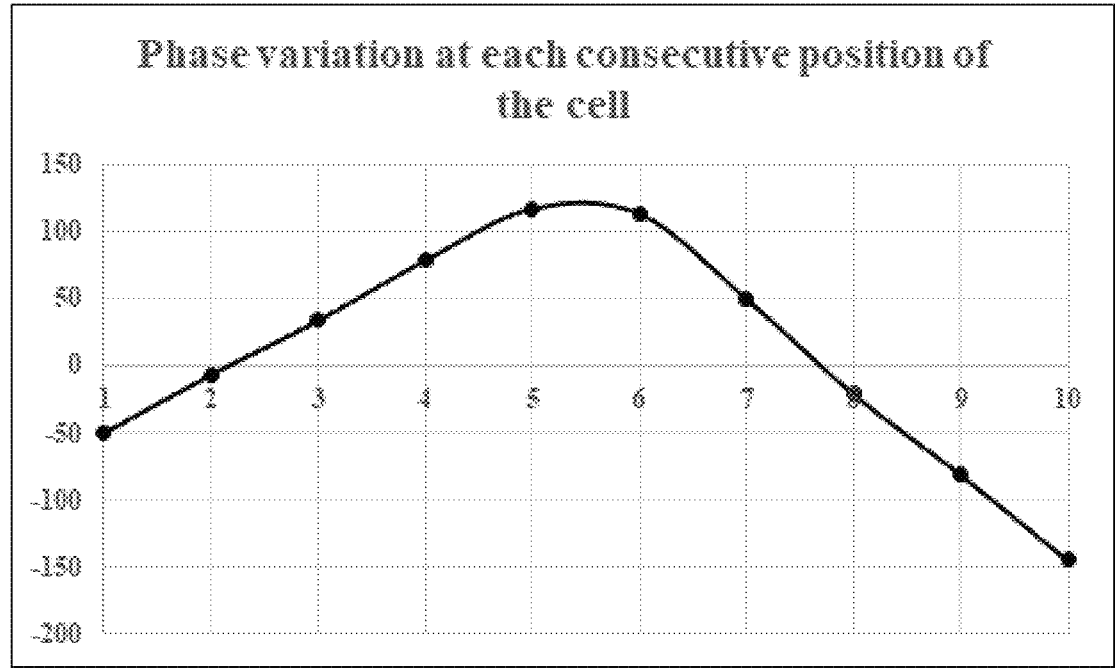
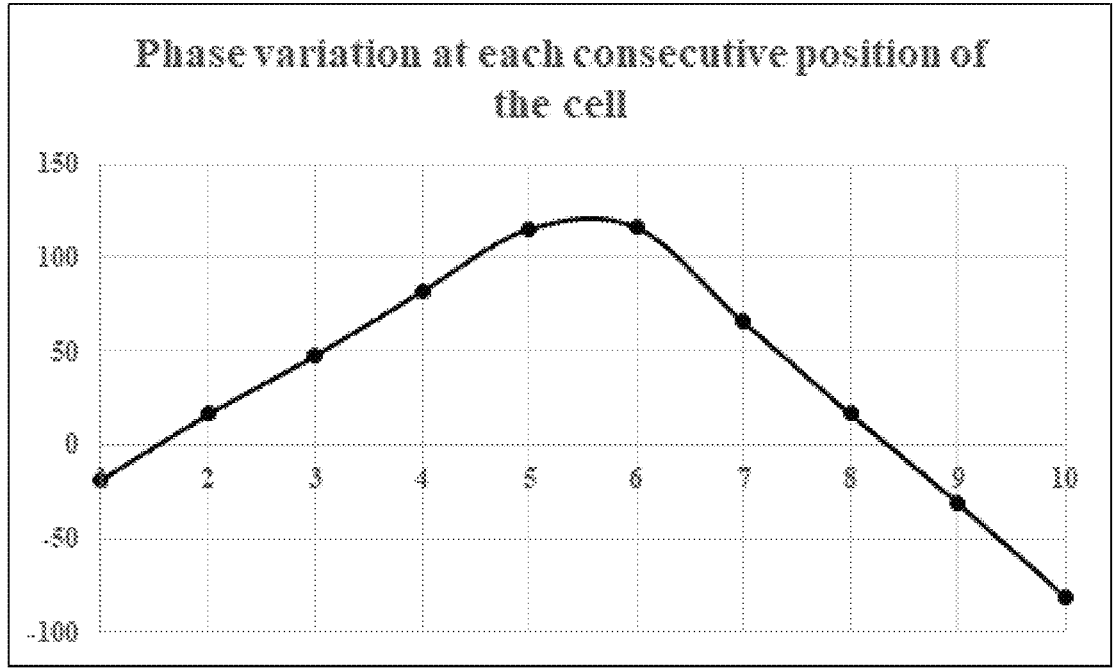
FIG 12A

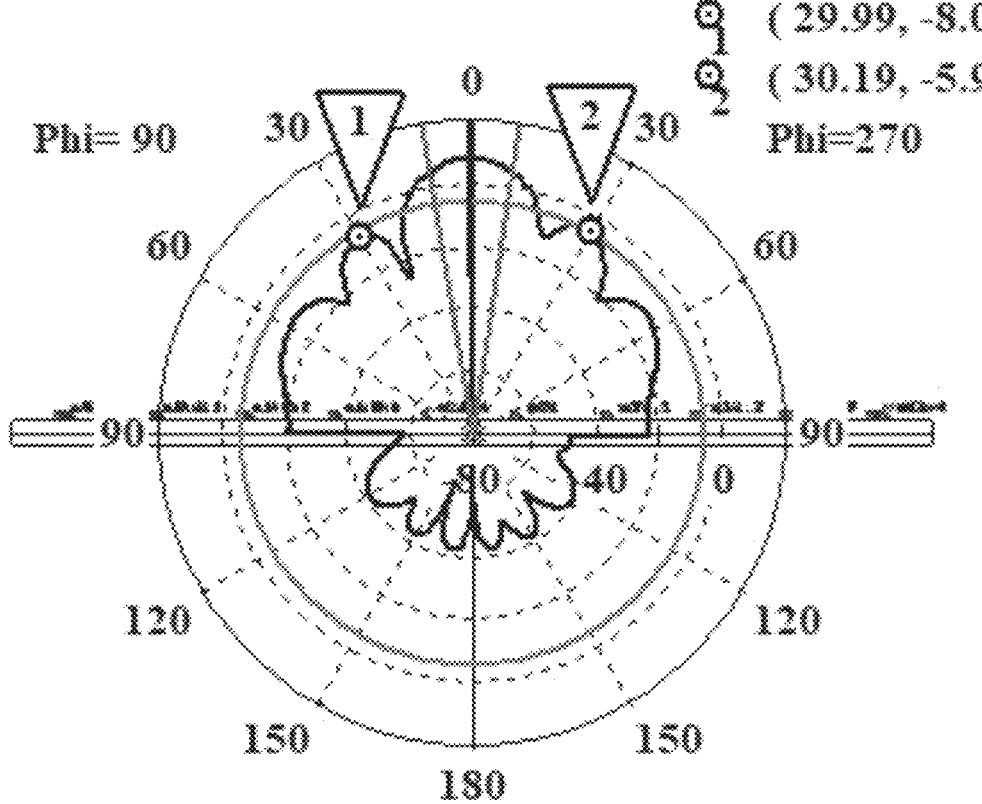
Theta / Degree vs. dB(m^2)
Frequency = 3.5 GHz
Main lobe magnitude =    7.49 dB(m^2)
Main lobe direction =    1.0 deg.
Angular width (3 dB) =    17.6 deg.
Side lobe level =  -13.2 dB
FIG 12B

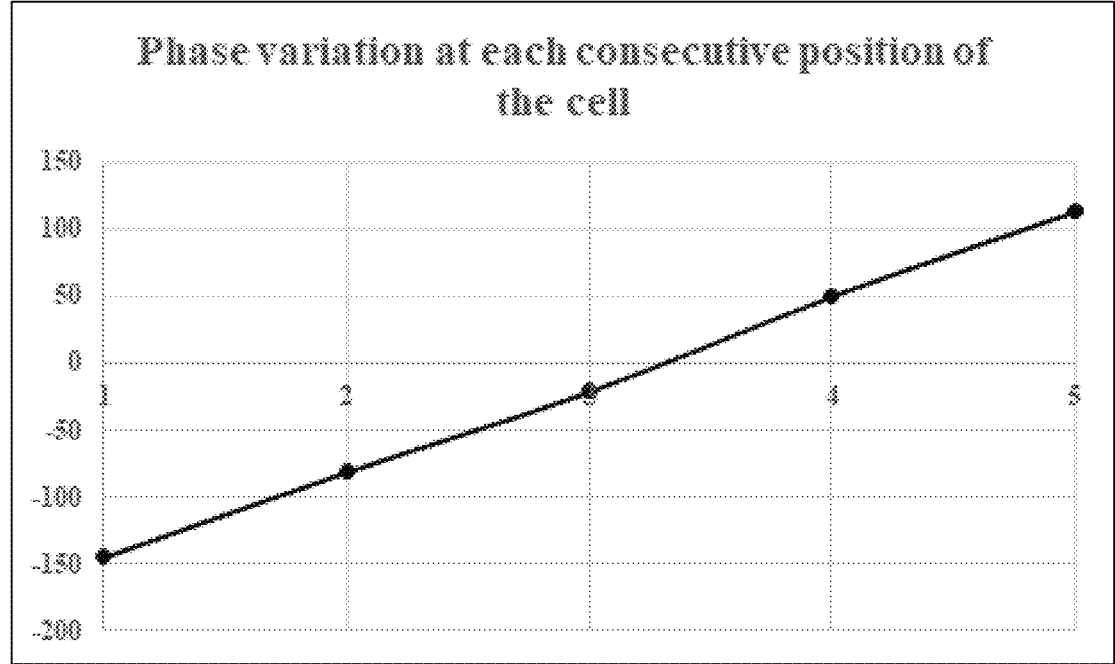
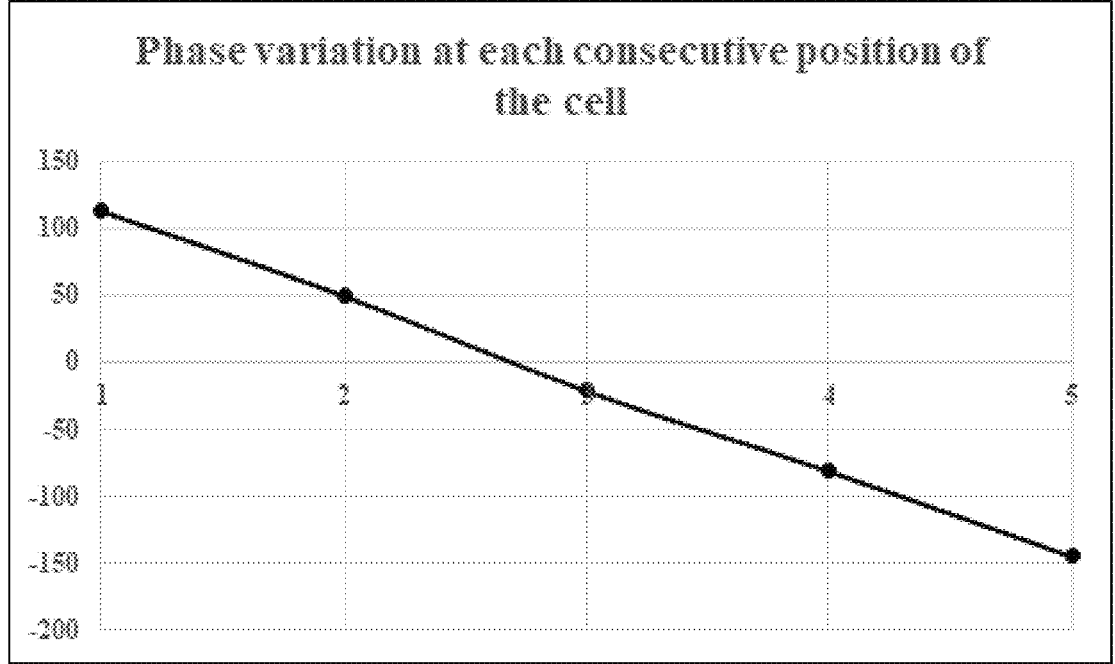
FIG 13

700 placing a composite reconfigurable intelligent surface (CRIS) comprising a set of constituent reflecting surfaces in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment — 702 connecting a set of voltage control units to the CRIS and configuring for phase shifting the one or more RF signals — 704 obtaining a set of pre-defined voltage profiles such that the set of pre-defined voltage profiles programs phase one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces — 706

FIG 16

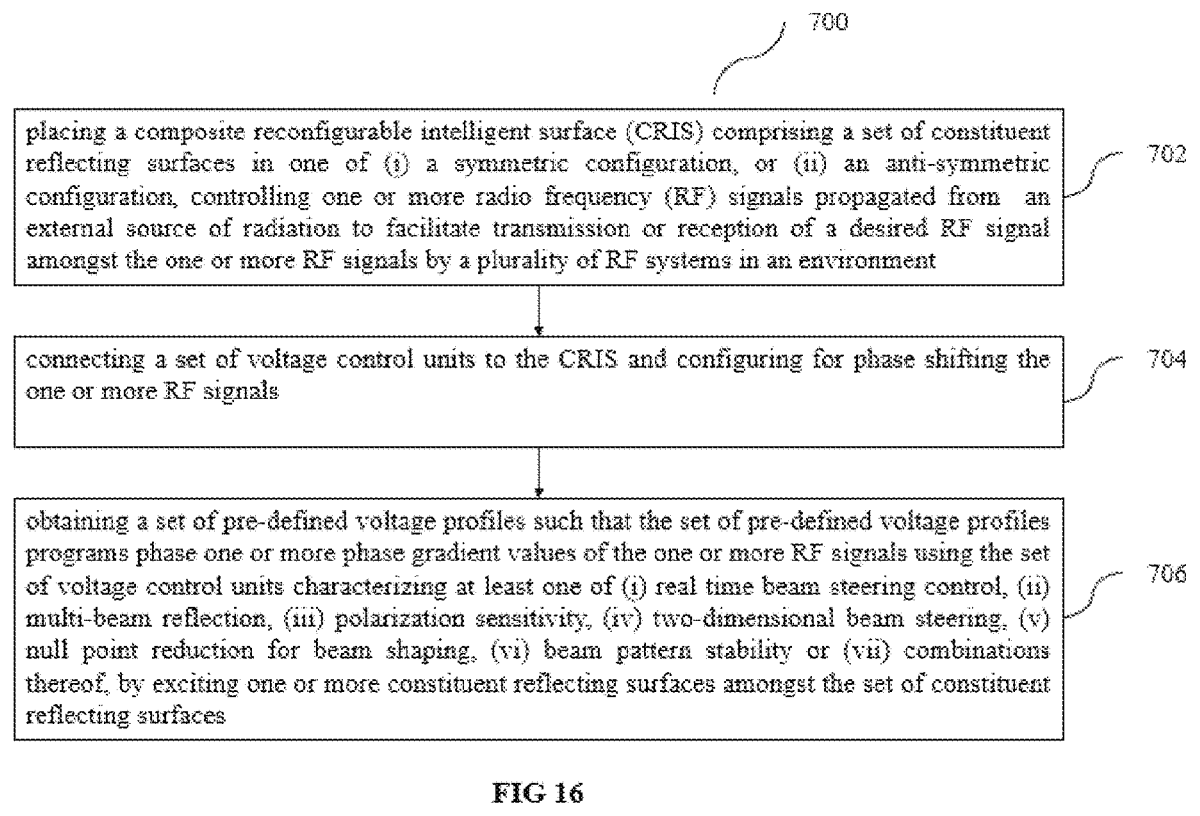

COMPOSITE RECONFIGURABLE INTELLIGENT SURFACE SYSTEM FOR REAL TIME BEAM STEERING AND METHOD THEREOF

PRIORITY CLAIM

This U.S. patent application claims priority under 35 U.S.C. § 119 to: Indian Patent Application number 202321080776, filed on Nov. 28, 2023. The entire contents of the aforementioned application are incorporated herein by reference.

TECHNICAL FIELD

The disclosure herein generally relates to reconfigurable intelligent surface system, and, more particularly, to a composite reconfigurable intelligent surface system for real time beam steering and method thereof.

BACKGROUND

With the advent of next-generation communication systems and evolution of sensing-dependent Internet of Things (IoT)-based solutions, achieving real-time beamforming and seamless beam steering capabilities has been an important focal point of research. This requires effective design of ancillary devices which may redirect or shape the radiated beams from the primary radiators towards specific objects as per requirement. Smart wireless systems, which require effective power management and further ensure secured communication through highly directed signal beams, often take help from the practical idea of reconfigurable intelligent surface (RIS), for various applications. For efficient non-line of sight (LoS) communication systems which aim to cater for IoT environments and sensing applications, primary radiators or the source access points (APs) act in coordination with the RIS structures. Few conventional methods use metasurface design which consist of several active antenna elements and amplifiers to shape and control the beam. However, these systems are very bulky in size and space consuming.

SUMMARY

Embodiments of the present disclosure present technological improvements as solutions to one or more of the above-mentioned technical problems recognized by the inventors in conventional systems.

In an aspect, there is provided a composite reconfigurable intelligent surface system for real time beam steering comprising: a composite reconfigurable intelligent surface (CRIS) including a set of constituent reflecting surfaces placed in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment. Further the system comprises a set of voltage control units connected to the CRIS and configured for phase shifting the one or more RF signals. Furthermore, the system comprises a controller unit in communication with the set of voltage control units, wherein the controller unit comprises one or more data storage devices configured to store instructions; one or more communication interfaces; and one or more hardware processors operatively coupled to the one or more data storage devices via the one or more communication interfaces. The one or more hardware processors are configured to be operated by the instructions to obtain a set of pre-defined voltage profiles such that the set of pre-defined voltage profiles programs one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

In another aspect, there is provided a processor implemented method comprising the steps of: placing a composite reconfigurable intelligent surface (CRIS) comprising a set of constituent reflecting surfaces in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment. Each constituent reflecting surface is generated from an N*M array of a set of unit cells for reflecting the one or more RF signals in a desired direction. Further the method includes connecting a set of voltage control units to the CRIS and configuring for phase shifting the one or more RF signals. Each constituent reflecting surface of the CRIS is connected to at least one voltage control unit amongst the set of voltage control units. Furthermore, the method includes obtaining a set of pre-defined voltage profiles such that the set of pre-defined voltage profiles programs phase one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

Each unit cell comprises a Minkowski shaped fractal patch disposed on a first substrate layer of a two-layer substrate, with a ground plane sandwiched between the first substrate layer and a second substrate layer. A narrow slit bisects the Minkowski shaped fractal patch to facilitate placement of a varactor diode. The Minkowski shaped fractal patch has a predefined width and a predefined breadth.

The symmetric configuration of the CRIS enables a one-dimensional degree of freedom by tilting the reflected one or more RF signals along a horizontal direction. The anti-symmetric configuration of the CRIS enables a two-dimensional degree of freedom and polarization sensitivity by tilting the reflected one or more RF signals along (i) the horizontal direction, (ii) a vertical direction, or (iii) a combination thereof. The one or more phase gradient values of the one or more RF signals are programmed by biasing a set of varactor diodes of the set of unit cells using the set of pre-defined voltage profiles.

In yet another aspect, there is provided a computer program product comprising a non-transitory computer readable medium having a computer readable program embodied therein, wherein the computer readable program, when executed on a computing device causes the computing device for real time beam steering by placing a composite reconfigurable intelligent surface (CRIS) comprising a set of constituent reflecting surfaces in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment. Each constituent reflecting surface is generated from an N*M array of a set of unit cells for reflecting the one or more RF signals in a desired direction. Further the computer readable program includes connecting a set of voltage control units to the CRIS and configuring for phase shifting the one or more RF signals. Each constituent reflecting surface of the CRIS is connected to at least one voltage control unit amongst the set of voltage control units. Furthermore, the computer readable program includes obtaining a set of pre-defined voltage profiles such that the set of pre-defined voltage profiles programs phase one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A and FIG. 5B illustrate a schematic diagram and a physical layout of a first type of constituent reflecting surface in CRIS respectively according to some embodiments of the present disclosure.

FIG. 12A illustrates a fourth phase profile variation provided to the symmetric configuration of the CRIS depicted in FIG. 7B and FIG. 12B illustrates a 2-dimensional representation of beam tilt performance for the same according to some embodiments of the present disclosure.

FIG. 13 illustrates a fifth phase profile variation provided for the anti-symmetric configuration of the CRIS depicted in FIG. 8B according to some embodiments of the present disclosure.

FIG. 16 is an exemplary flow diagram illustrating a computer implemented method for real time beam steering by CRIS in accordance with some embodiments of the present disclosure.

DETAILED DESCRIPTION

Figure 1:
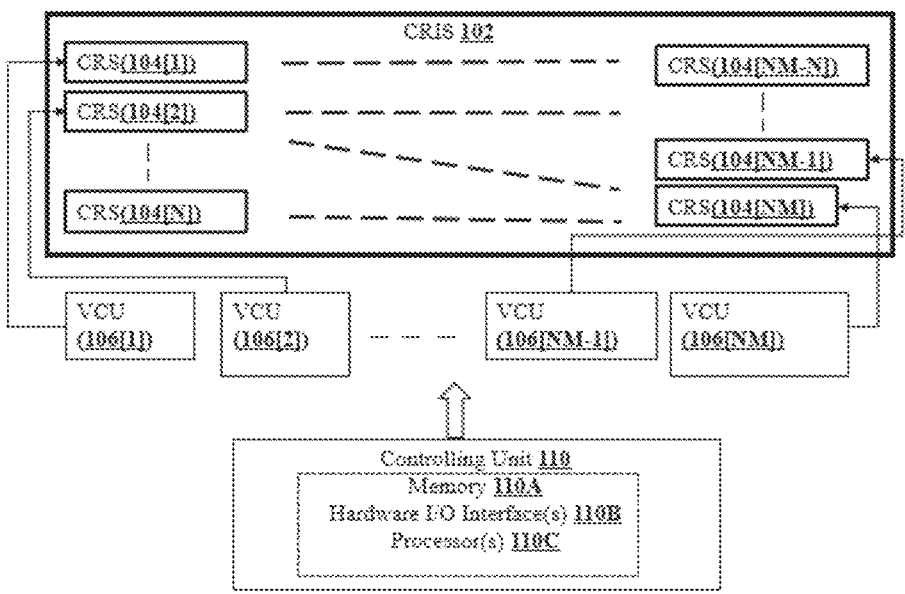
FIG. 1 illustrates an exemplary block diagram of a composite reconfigurable intelligent surface (CRIS) system for real time beam steering according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Reconfigurable reflecting structures are generally conceived as 2-dimensional (2D) plates with large number of sub-wavelength reflecting elements, generally loaded with active electronic components like diodes or varactors on them. These active electronic components are responsible for providing a phase-shift to the reflected wave which allows the beam to be anomalously reflected towards a specific direction; and not solely at an angle of reflection that equals the angle of incidence. With the advent of metamaterials and metasurface designs, different exquisite geometric shapes are now being utilized to control the phase characteristics of such elements. Reconfigurable intelligent surfaces (RIS) are known to provide real-time phase profile variation to achieve specific beam steering requirements. RIS can reconfigure the wireless propagation environment to a transmission medium with more ideal characteristics to achieve optimization of uncontrolled reflections, refractions, and unexpected disturbances in a wireless environment. This is done by adjusting the phase and amplitude response of the incident electromagnetic wave. This helps in achieving dynamic beamforming, improving spectral efficiency, and overcoming the blockage.

The disclosed system considers a larger reflecting surface which is conceived as a composite surface made of constituent individual surfaces, which greatly enhances the functional diversity of the component. Accordingly, the phase profile is controlled over the larger surface in a region-specific manner which facilitates 2D beam steering operation. This also allows the user to decide the number of beams, their direction of reflection and offers polarization sensitive performance for robust practical use.

The disclosed invention provides detailed and rigorous characterization of a modified Minkowski fractal shaped reflective unit cell element, whose dimensions are optimized for operation over the n78 band of frequencies. The unit cell element is further slit across horizontally, to incorporate a varactor diode element in it, for phase control purposes. The unit cell element has unique geometric features such as the initial dimension of the Minkowski unit cell, the indentation width and depth, and the substrate periodicity. These ensure suitable reflection performance at the desired range of frequencies. The unit cell elements are characterized as the capacitance of the incorporated varactor component which is varied with respect to a bias voltage provided from outside, and the reflection-phase performance is obtained. Utilizing this collection of information, individual tiles are designed from the unit cell element with suitable phase gradient profiles incorporated on them through appropriate biasing arrangements. From these tiles, composite reconfigurable intelligent surface (CRIS) is generated.

Referring now to the drawings, and more particularly to FIG. 1 through FIG. 16, where similar reference characters denote corresponding features consistently throughout the figures, there are shown preferred embodiments and these embodiments are described in the context of the following exemplary system and/or method.

FIG. 1 illustrates an exemplary block diagram of a composite reconfigurable intelligent surface (CRIS) 102 system for real time beam steering according to some embodiments of the present disclosure. The CRIS 102 includes a set of constituent reflecting surfaces (104[1 . . . . NM−1, NM]) placed in one of (i) a symmetric configuration, or (ii) an anti-symmetric configuration. The CRIS 102 controls one or more radio frequency (RF) signals propagated from an external source of radiation to facilitate transmission or reception of a desired RF signal amongst the one or more RF signals by a plurality of RF systems in an environment. Each constituent reflecting surface 104 is generated from a predefined N*M array of a set of unit cells for reflecting the one or more RF signals in a desired direction.

Figure 2:
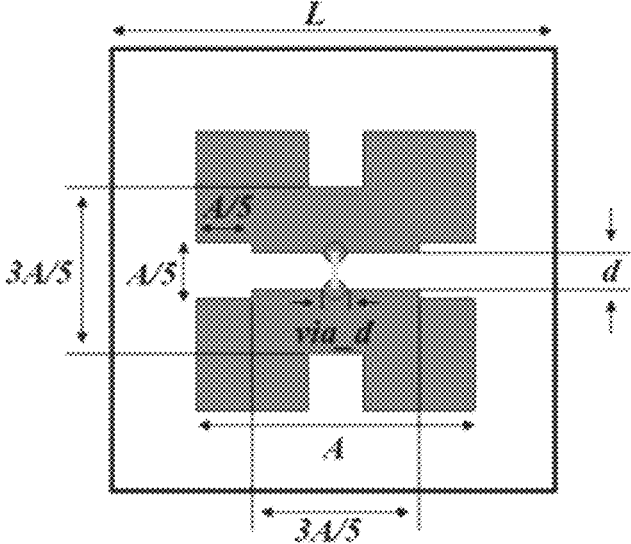
FIG. 2 depicts a top view of a unit cell of the CRIS according to some embodiments of the present disclosure.
Figure 3:
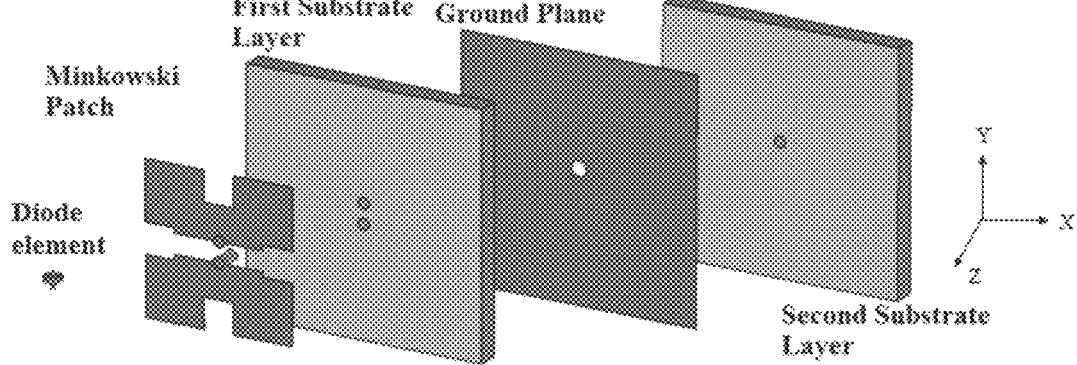
FIG. 3 depicts an exploded view of the unit cell of the CRIS according to some embodiments of the present disclosure.

FIG. 2 depicts a top view of a unit cell of the CRIS 102 according to some embodiments of the present disclosure. A unit cell comprises a Minkowski shaped fractal patch disposed on a first substrate layer of a two-layer substrate, with a metallic ground plane sandwiched between the first substrate layer and a second substrate layer. A narrow slit is etched out, bisecting the fractal patch in the middle, which facilitates the varactor diode element to be placed as shown in FIG. 2. The Minkowski shape is modified by appropriately choosing the indentation width and breadth, instead of using a conventional Minkowski fractal geometry. This facilitates maximizing the current path along the structure. Also, it ensures effective miniaturization of the component and its suitable performance operating at the desired frequencies at the n78 (3.5 GHz 5G band, or C-band 5G) band of frequencies. FIG. 2 shows all the design dimensions of the Minkowski shaped fractal patch. FIG. 3 depicts an exploded view of the unit cell of the CRIS according to some embodiments of the present disclosure. The exploded view describes the different layers of the unit cell and shows the metallic sheet acting as the ground plane sandwiched in the middle of two substrates. Holes are drilled through the metallic ground plane and substrate layers as necessary to establish the biasing circuits for the diode in the structure. The dimensions of the slit and the semi-circular pads, having diameters via_d as shown in FIG. 3, are decided based on the dimensions of the diode model used (For example: Model Number SMV2201-040LF). The biasing via rods were placed at the center of the Minkowski shaped fractal patch to facilitate voltage control of the varactor elements. Table 1 describes the optimized parameter values for the designed unit cell. The structure is designed and simulated on FR-4 glass epoxy substrate having dielectric constant 4.4 and thickness 3.2 mm.

TABLE 1

| Name of the Parameter | Value (mm) |
| --- | --- |
| L | 25 |
| A | 10 |
| d | 0.65 |
| via_d | 0.4 |

Figure 4:
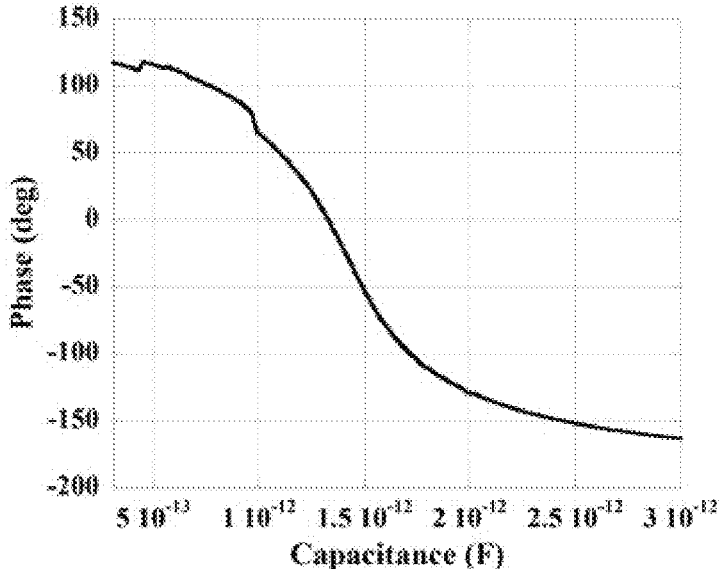
FIG. 4 depicts a graphical plot for reflection phase versus capacitance for the unit cell at 3.5 Ghz according to some embodiments of the present disclosure.

The modified phase of the reflected waves from the reflective unit cell element is controlled through the capacitance of the varactor diode component. By applying suitable bias voltages, different reflection phase values are obtained with different values of capacitance. FIG. 4 depicts a graphical plot for reflection phase versus capacitance for the unit cell at 3.5 Ghz according to some embodiments of the present disclosure. The graph in FIG. 4 depicts the reflection-phase versus capacitance plot for the unit cell at 3.5 GHz, when the diode capacitance is varied from 0.3 pF to 3 pF in simulations. The graph shows a phase variation from 115 degree to nearly-165 degree, for this varied range of capacitances. This enables the unit cells to be used to generate gradient phase reflecting surfaces by suitable voltage biasing techniques, which will ensure different phase values from different unit cells on the designed surfaces. If a phase difference of $\Delta\phi$ is applied over the unit-cells then according to generalized Snell's law, the tilt angle of the beam $\theta$ is calculated as, $$\theta = \sin^{-1}\left(\frac{\lambda}{\Delta P} \cdot \frac{\Delta\phi}{360}\right) \text{degree} \tag{1}$$

where, $\lambda$=wavelength of the incident wave, $\Delta P$=periodicity of the unit cell, $\Delta\phi$=phase gradient between two adjacent unit cells (in degree). Using equation 1, constituent reflecting surface is designed which is further used to generate CRIS.

Figure 6A:
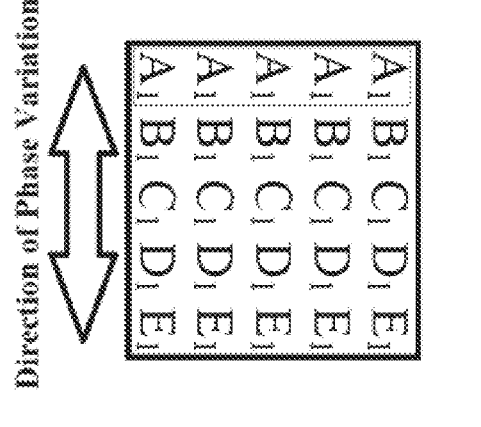
FIG. 6A and FIG. 6B illustrate a schematic diagram and a physical layout of a second type of constituent reflecting surface in CRIS respectively according to some embodiments of the present disclosure.
Figure 6B:
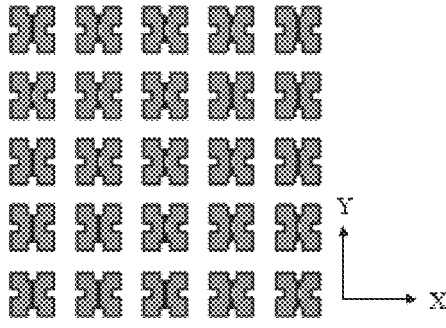

The CRIS 102 further comprises a set of voltage control units (106[1, . . . , NM−1, NM]) which are connected to the CRIS 102. They are configured for phase shifting the one or more RF signals, wherein each constituent reflecting surface 104 of the CRIS 102 is connected to at least one voltage control unit 106 amongst the set of voltage control units (106[1, . . . , NM−1, NM]). The constituent reflecting surface for the CRIS is designed as a N*M array layout comprising of N*M unit cells. For each of these unit cells the corresponding varactor components will be biased by a specific voltage value to obtain a specific phase-reflection performance. FIG. 5A and FIG. 5B illustrate a schematic diagram and a physical layout of a first type of constituent reflecting surface in CRIS respectively according to some embodiments of the present disclosure. In FIG. 5A and FIG. 5B a 5*5 layout comprising of 25 unit cells are shown for the first type of constituent reflecting surface. Each column in FIG. 5A has a specific phase-reflection performance (depicted by unit cell types as A1, B1, C1, D1, and E1 respectively), and the phase is gradually varying in a column-wise manner along the horizontal direction. FIG. 5B describes the corresponding physical layout in terms of actual simulated components. This ensures that the reflected beam will be tilted along horizontal direction, in which the gradual phase variation occurs, and the beam tilt will follow the direction in which the phase is gradually decreasing. The structure will be excited only when the incident electric (E)-field is parallel to the Y-axis i.e., in vertical polarization, as the varactor diode components' current paths lie along the same direction. If the layout is rotated by 90 degrees with respect to Z-axis (i.e., the direction of propagation for the incident and reflected signals), a layout as shown in FIG. 6A and FIG. 6B is obtained. FIG. 6A and FIG. 6B illustrate a schematic diagram and a physical layout of a second type of constituent reflecting surface in CRIS respectively according to some embodiments of the present disclosure. For this layout, the structure is excited only when the incident E-field is parallel to the X-axis i.e., in horizontal polarization, as the varactor diode components' current paths lie along the same direction. Hence, by simple rotation, polarization sensitivity is obtained for the constituent reflecting surface loaded with varactor components to ensure the phase gradient nature of the surfaces. Additionally, as per the simulated structure in FIG. 5B, a beam-tilt along the horizontal direction i.e., X-axis is obtained, whereas as per the simulated structure in FIG. 6B, a beam-tilt along the vertical direction i.e., Y-axis is obtained.

The CRIS system 100 further comprises a controller unit 110 in communication with the set of voltage control units (106[1, . . . , NM−1, NM]). The controller unit comprises one or more data storage devices or memory 110A configured to store instructions, one or more communication interfaces 110B, and one or more hardware processors 110C operatively coupled to the one or more data storage devices via the one or more communication interfaces 110B. The one or more hardware processors 110C are configured by the instructions to perform real time beam steering.

The one or more hardware processors 110C can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the one or more hardware processors 110C can be implemented in a variety of computing systems, such as laptop computers, notebooks, hand-held devices, workstations, mainframe computers, servers, a network cloud, and the like.

In an embodiment, the communication interface(s) or input/output (I/O) interface(s) 110B may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The one or more data storage devices or memory 110A may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the one or more hardware processors 110C are configured to obtain a set of pre-defined voltage profiles. These set of pre-defined voltage profiles programs one or more phase gradient values of the one or more RF signals using the set of voltage control units (106[1, . . . , NM−1, NM]). This characterizes at least one of (i) real time beam steering control, (ii) multi-beam reflection, (iii) polarization sensitivity, (iv) two-dimensional beam (vii) combinations thereof. These are characterized by exciting one or more constituent reflecting surfaces amongst the set of constituent reflecting surfaces (104[1, . . . , NM−1, NM]). This is explained further below with the help of FIG. 7A through FIG. 15B.

Figure 7A:
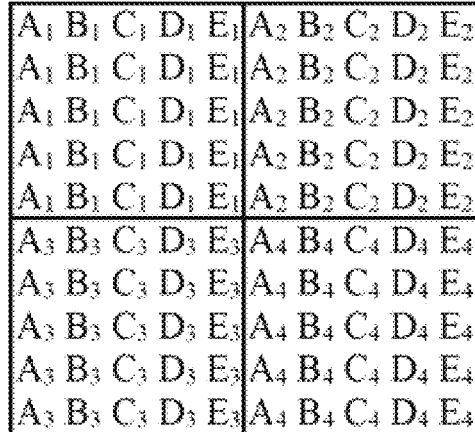
FIG. 7A and FIG. 7B illustrate a schematic diagram and a physical layout of a symmetric configuration of the CRIS respectively according to some embodiments of the present disclosure.
Figure 7B:
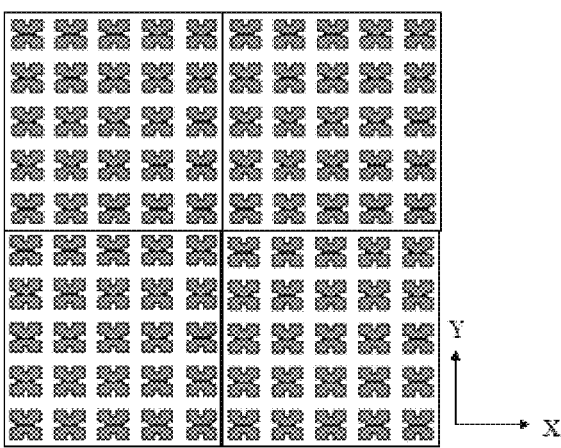
Figure 8A:
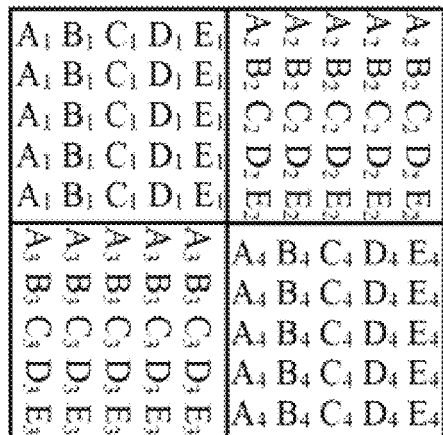
FIG. 8A and FIG. 8B illustrate a schematic diagram and a physical layout of an anti-symmetric configuration of the CRIS respectively according to some embodiments of the present disclosure.
Figure 8B:
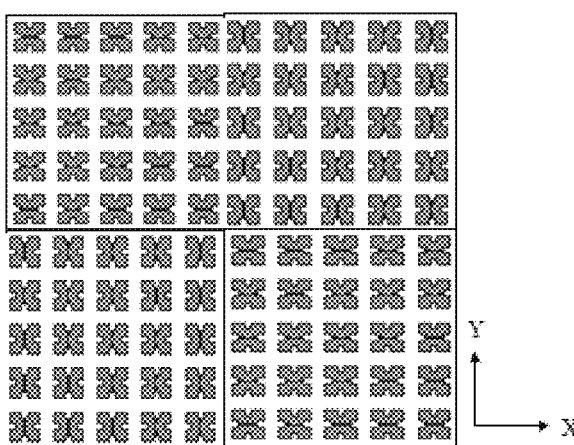

FIG. 7A through FIG. 8B show the two configurations of the CRIS and are considered as two variants of the CRIS. FIG. 7A and FIG. 7B illustrate a schematic diagram and a physical layout of a symmetric configuration of the CRIS respectively according to some embodiments of the present disclosure. FIG. 8A and FIG. 8B illustrate a schematic diagram and a physical layout of an anti-symmetric configuration of the CRIS respectively according to some embodiments of the present disclosure. The symmetric configuration of the CRIS can tilt the reflected beam along the horizontal direction only, i.e., it provides a one-dimensional degree of freedom so far as the beam steering feature is concerned. However, by suitably designing the phase profile of the constituent reflecting surfaces, the direction of beam tilt (towards the positive or negative horizontal axis) and the number of reflected beams can be controlled. This is explained in the paragraphs below. On the other hand, the anti-symmetric configuration describes a two-dimensional degree of freedom in terms of beam tilting operations and propose itself as a polarization dependent component, as per suitable phase profile design for the constituent reflecting surface.

Figure 9A:
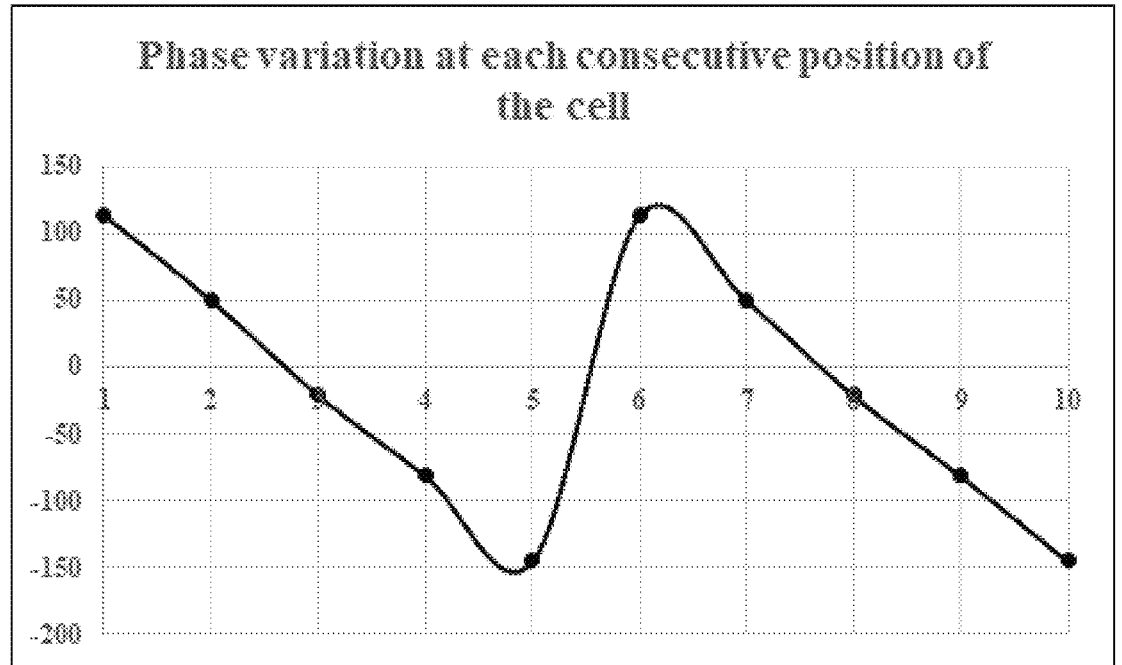
FIG. 9A illustrates a first phase profile variation for the symmetric configuration of the CRIS as depicted in FIG. 7B
Figure 9B:
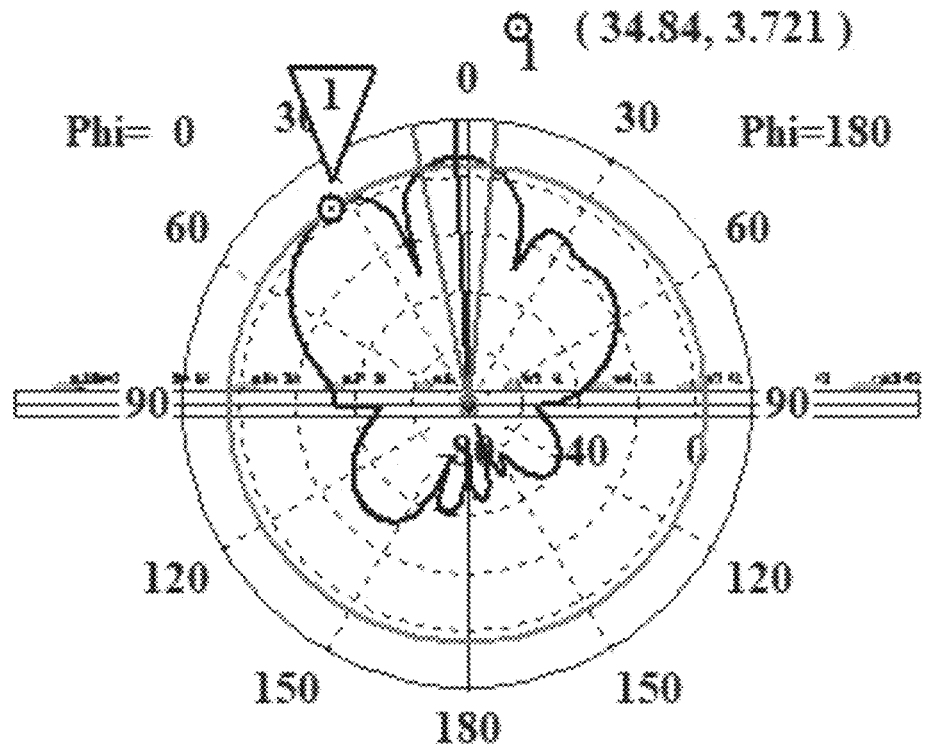
FIG. 9B illustrates a 2-dimensional representation of beam tilt performance for the first phase profile variation according to some embodiments of the present disclosure.

The different configurations as shown in FIG. 7A through FIG. 8B are analyzed with different phase profile variations to characterize their reflection performance. FIG. 9A shows an incorporated first phase profile for the symmetric configuration of the CRIS as depicted in FIG. 7. FIG. 9A describes the varied phase reflection attributes of the unit cell elements along the first row of the CRIS, and the same profile is repeated row-wise till the bottom of the CRIS structure. From the phase profile curve as shown in FIG. 9A, it is evident that for the two constituent reflecting surface tiles at the top, repeated phase profiles are implemented. The same repetition is applied to the bottom two constituent reflecting surface tiles as well. The curve shows the phase to be gradually decreasing along the horizontal direction in a left-to-right manner. The beam tilt is also obtained along the same direction. As per equation (1), since for the symmetric configuration of the CRIS, the phase difference between the consecutive unit cells is taken as 63.15 degree, which amounts to a beam tilt of 37-degree. FIG. 9B illustrates a 2-dimensional representation of beam tilt performance for the first phase profile variation according to some embodiments of the present disclosure. FIG. 9B shows the simulated beam tilt which comes at 34.84 degree.

Figure 10A:
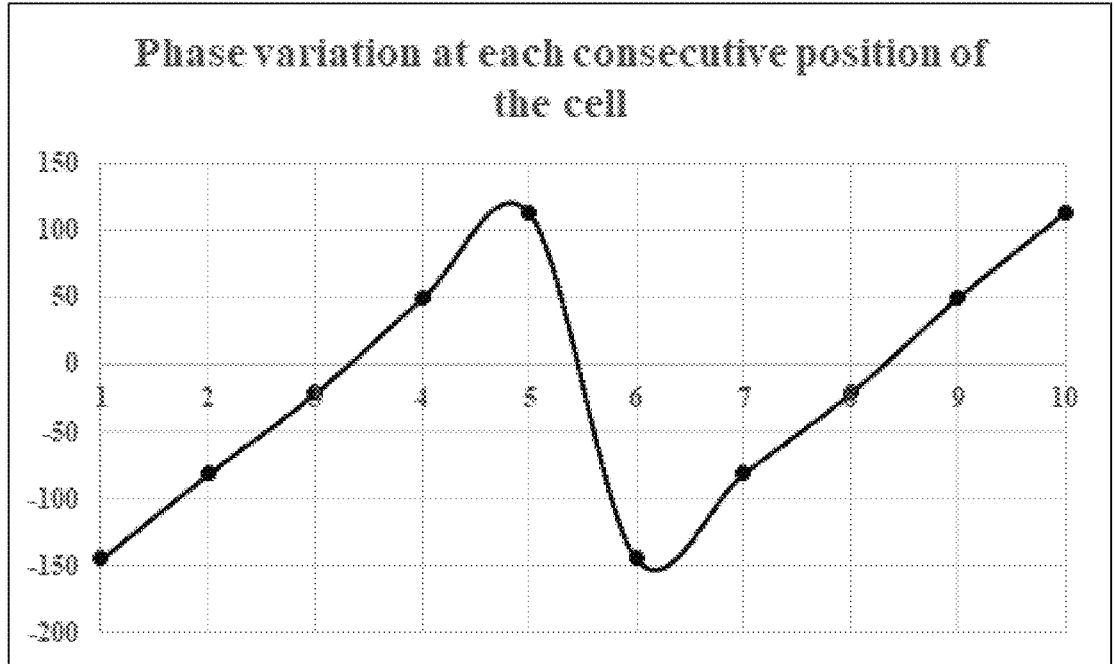
FIG. 10A illustrates a second phase profile variation for the symmetric configuration of the CRIS as depicted in FIG. 7B
Figure 10B:
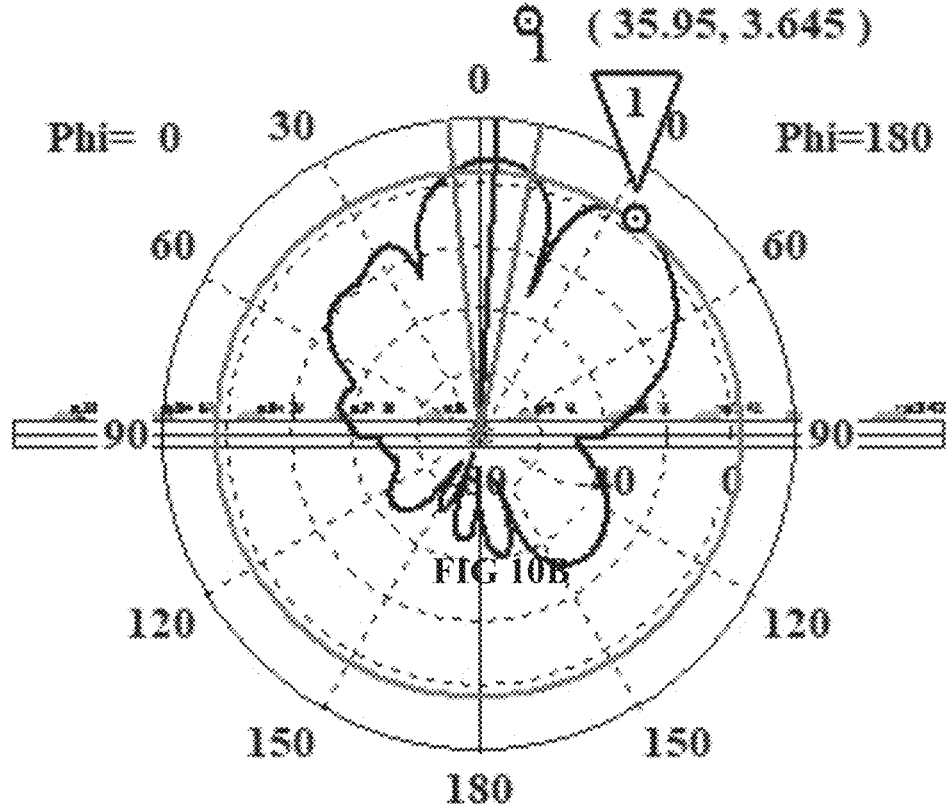
FIG. 10B illustrates a 2-dimensional representation of beam tilt performance for the second phase profile variation according to some embodiments of the present disclosure.
Figure 11A:
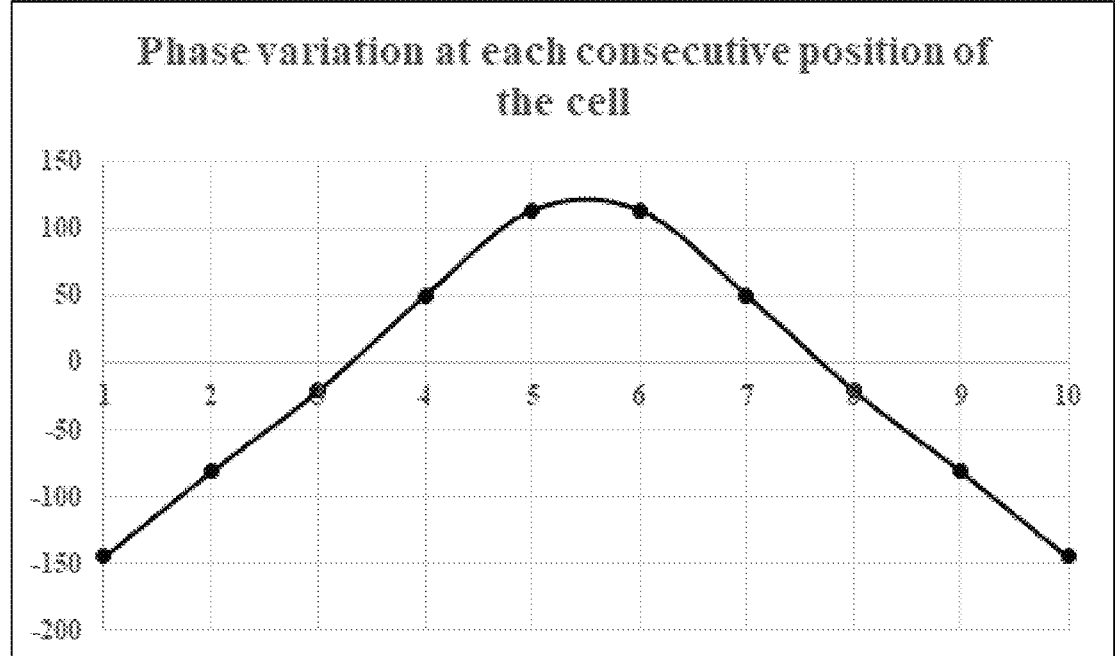
FIG. 11A illustrates a third phase profile variation for the symmetric configuration of the CRIS as depicted in FIG. 7B
Figure 11B:
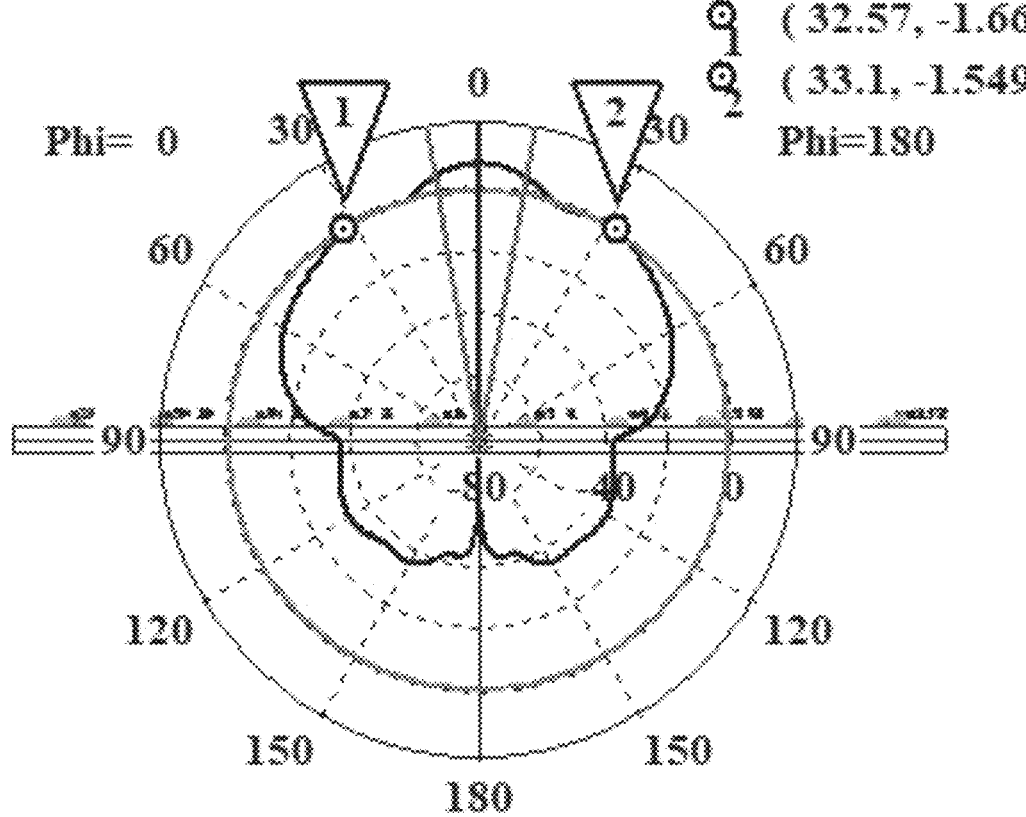
FIG. 11B illustrates a 2-dimensional representation of beam tilt performance for the third phase profile variation according to some embodiments of the present disclosure.

FIG. 10A illustrates a second phase profile variation for the symmetric configuration of the CRIS as depicted in FIG. 7B. The second profile phase variation is the exact reverse of the profile as shown in FIG. 9A. FIG. 10B shows that, by only reversing the phase profile a beam tilt in the exact reverse direction is obtained, at the specific angle for which the profile was implemented. FIG. 11A illustrates a third phase profile variation for the symmetric configuration of the CRIS as depicted in FIG. 7B. The phase profile variation shown in FIG. 11A is two-way reducing phase profile so that a beam reflection performance is obtained as shown in FIG. 11B. The varied phase reflection attributes of the unit cell elements continue along the first row of the structure (as in the previous cases), and the same profile is repeated row-wise till the bottom of the structure. FIG. 11B illustrates a 2-dimensional representation of beam tilt performance for the third phase profile variation according to some embodiments of the present disclosure. FIG. 11B describes the reflection performance, where two distinct reflected beams are obtained apart from the main lobe reflection, and their angles of reflection are close to the theoretical calculations.

In a fourth phase profile variation and a fifth phase profile variation, distinct phase profiles are implemented to the two constituent reflection surface tiles at the top and the two constituent reflection surface tiles at the bottom of the symmetric configuration as shown in FIG. 7B. FIG. 12A illustrates a fourth phase profile variation provided to the symmetric configuration of the CRIS. The fourth phase profile variation is arranged in such a way, such that phase is getting reduced, along the opposite directions of the constituent reflecting surface for each tile-pair. This further ensures effective two-way reflection of the incoming beam. The upper two constituent reflecting surface tiles have phase profiles designed to implement a horizontal beam tilt of 25-degree and 37-degree respectively. Similarly, the lower two constituent reflecting surface tiles have phase profiles designed to implement a horizontal beam tilt of 18-degree and 28-degree respectively. So far from the characterization of the symmetric configuration of the CRIS, a single and dual-beam reflection performance is obtained based on phase profile selection. FIG. 12B illustrates a 2-dimensional representation of beam tilt performance for the same according to some embodiments of the present disclosure. The phase profile distribution controls the direction of beam-tilt. Moreover, by implementing varying phase profile scenarios for the constituent reflecting surface tiles of the composite CRIS structure, the beam-tilt angle can be controlled as well as the first null levels which amounts to further control over beam redirecting and shaping operations.

Figure 14A:
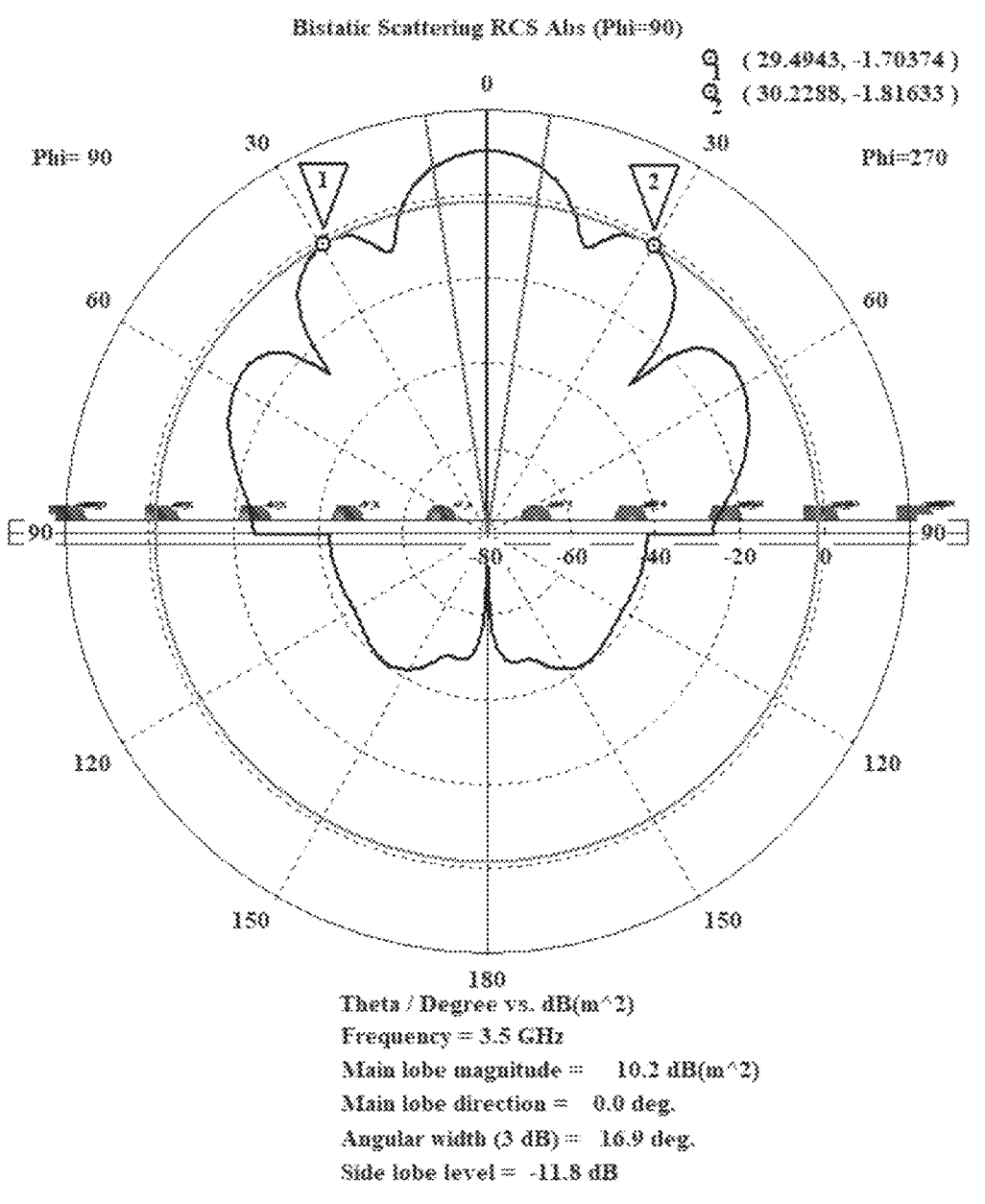
FIG. 14A and FIG. 14B illustrate a 2-dimensional representation of beam tilt performance of the fifth phase profile variation for a horizontal polarization and for a vertical polarization respectively according to some embodiments of the present disclosure.
Figure 14B:
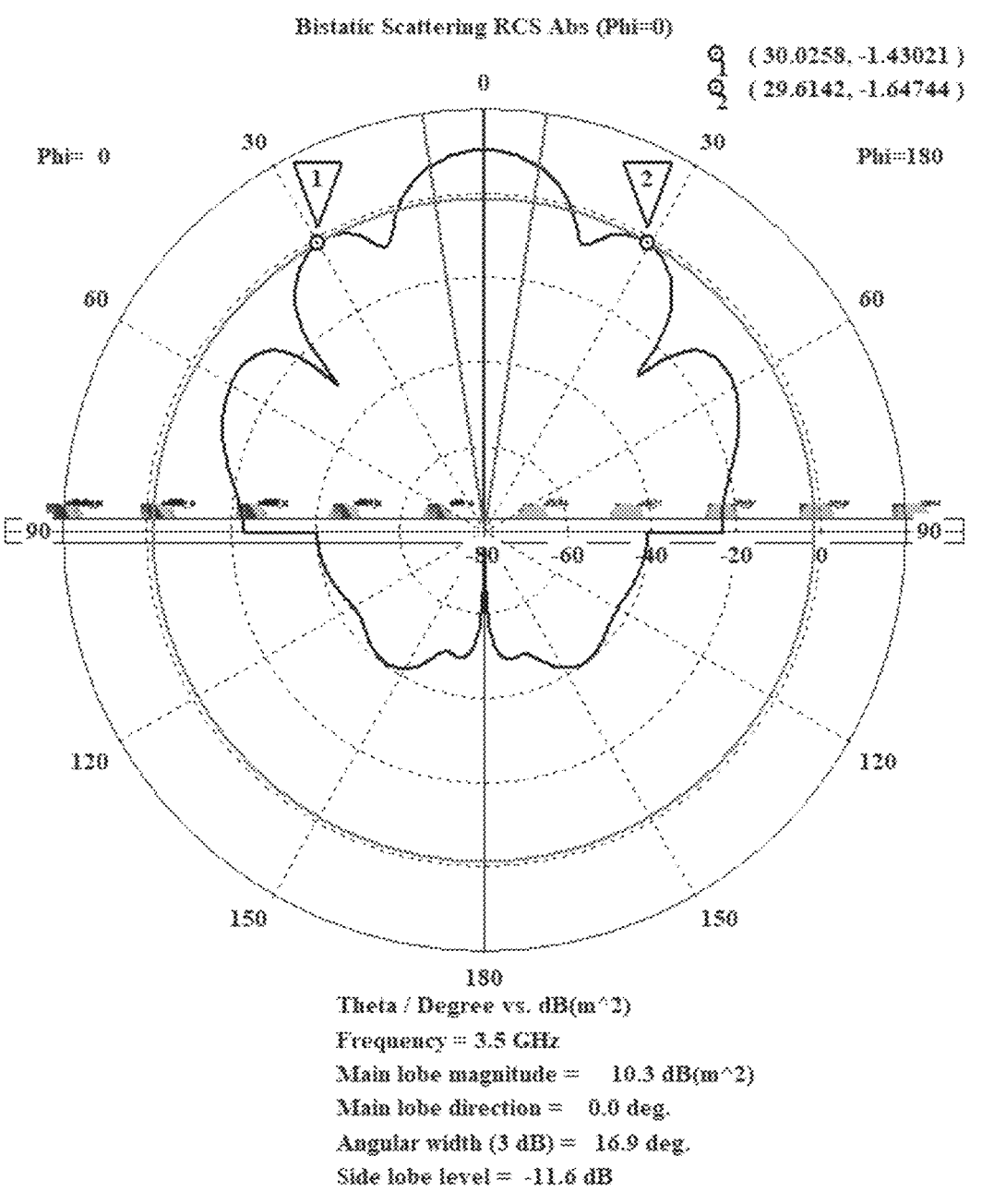

FIG. 13 illustrates a fifth phase profile variation provided for the anti-symmetric configuration of the CRIS depicted in FIG. 8B according to some embodiments of the present disclosure. For the anti-symmetric configuration, each of the four constituent reflecting surface tiles is specified with a phase profile design. In this configuration for all the tiles, the phase profile suitable for achieving a 37-degree beam tilt is applied, but along the suitable directions to provide two-dimensional, polarization sensitive beam-tilting performance. FIG. 13 describes the detailed phase profile implementation scheme for the anti-symmetric configuration of the CRIS, which is characterized by its polarization dependent intelligent reflection performance. If the anti-symmetric configuration of the CRIS is excited with a horizontally polarized signal, the constituent reflecting surface tiles which are anti-symmetrically rotated, play the dominant part in reflecting and steering the beam, which implies a dual beam reflection, with the reflected beams tilted along the vertical directions. FIG. 14A illustrates a 2-dimensional representation of beam tilt performance of the fifth phase profile variation for a horizontal polarization. If the anti-symmetric configuration of the CRIS is excited with a horizontally polarized signal, the constituent reflecting surface tiles which are anti-symmetrically rotated, play the dominant part in reflecting and steering the beam, which implies a dual beam reflection, with the reflected beams tilted along the vertical directions. If the anti-symmetric configuration of the CRIS is excited with a vertically polarized signal, the constituent reflecting surface tiles which are placed symmetrically, in an un-rotated manner, play the dominant part in reflecting and steering the beam, which implies a dual beam reflection, with the reflected beams tilted along the horizontal directions. FIG. 14B illustrates a 2-dimensional representation of beam tilt performance of the fifth phase profile variation for a vertical polarization.

Figure 15A:
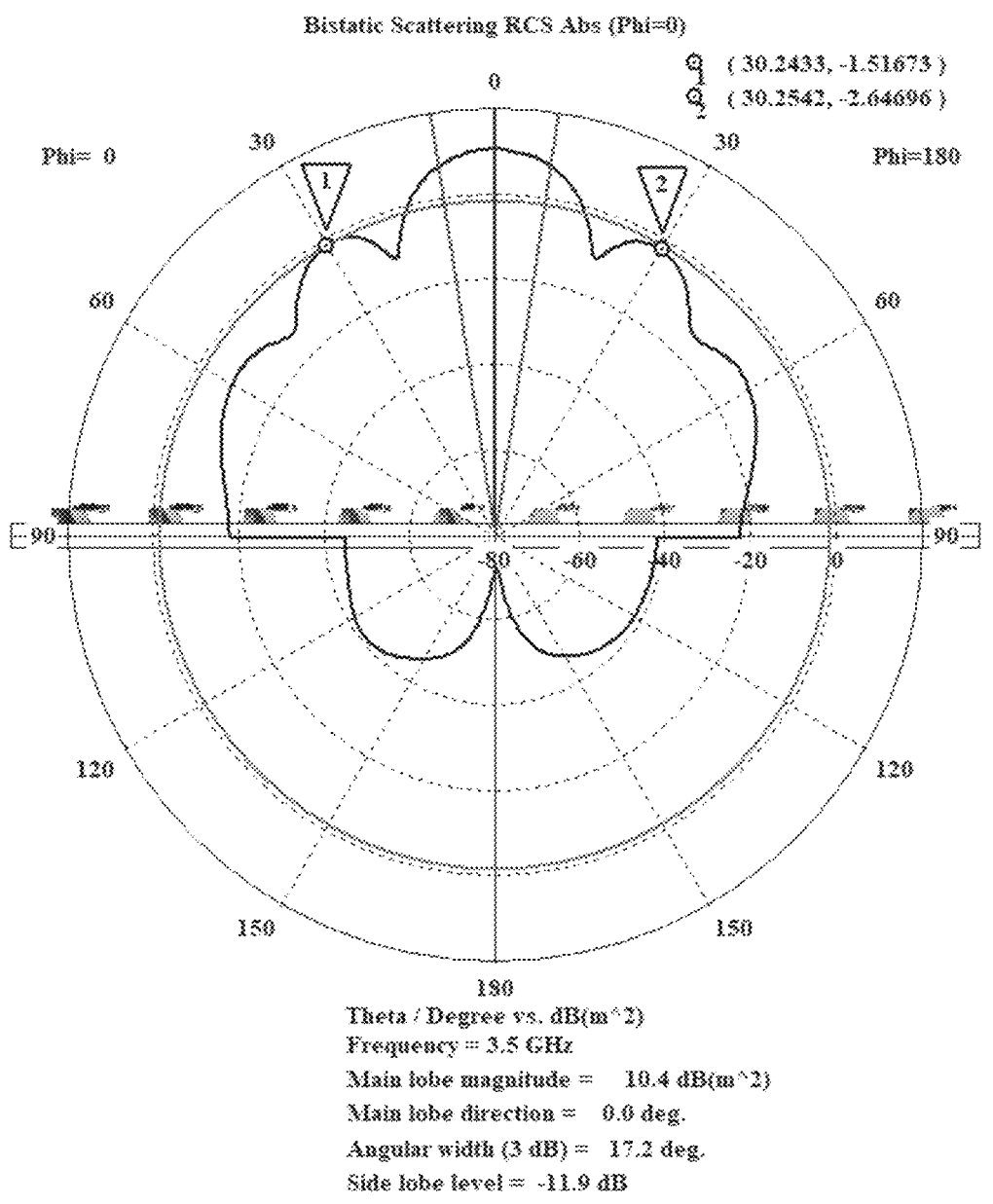
FIG. 15A and FIG. 15B illustrate a 2-dimensional representation for phi=0 degree and phi=90 degree of beam tilt performance of the fifth phase profile variation for a slant polarization according to some embodiments of the present disclosure.
Figure 15B:
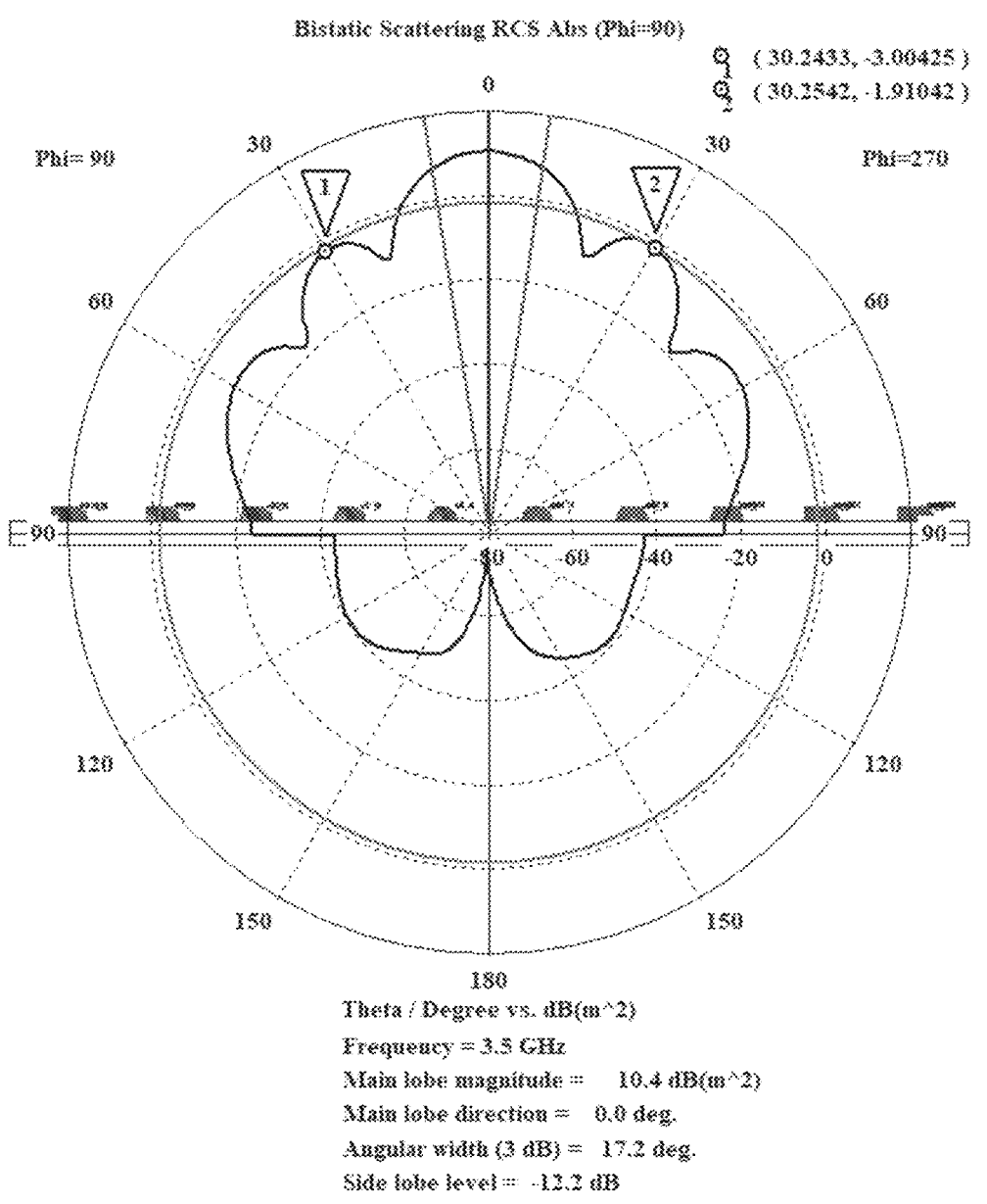

If the anti-symmetric configuration of the CRIS is excited with a slant polarized signal, all the constituent reflecting surface tiles play a shared and jointly dominant part in reflecting and steering the beam, which implies a quad-beam reflection, with the reflected beams tilted along both the horizontal and vertical directions. FIG. 15A and FIG. 15B illustrate a 2-dimensional representation for phi=0 degree and phi=90 degree of beam tilt performance of the fifth phase profile variation for a slant polarization according to some embodiments of the present disclosure. The 2D polar plots are given for both phi=0 (Ø=0) and phi=90 (Ø=90) cut-planes to elaborate the quad-beam performance and beam tilting phenomenon in both horizontal and vertical directions. This way the anti-symmetric configuration of the CRIS demonstrates polarization sensitive performance and 2D beam steering abilities with dual and quad-beam reflection characteristics under practical circumstances. The phase profiles can be chosen accordingly, to ensure specific angle of reflection. It is observed that the beam steering and reflection performances for all such CRIS designs remain stable over a suitable range of frequencies, approximately over a band of about 2 GHz, which justifies its robustness of applications. Reflected lobes are easily identified with significant null points separating them from the main lobe of the reflected patterns. Table 2 provides a brief outline of the functional features obtained from distinct phase profile variation selections.

TABLE 2

| Phase Profile Selection | CRIS Layout Used | Number of Reflected Beams (Apart from the Main Lobe) | Direction of Reflected Beams |
|---|---|---|---|
| First profile | Symmetric | 1 | +X |
| Second profile | Symmetric | 1 | −X |
| Third profile | Symmetric | 2 | ±X |
| Fourth profile | Symmetric | 2 | ±X |
| Fifth profile (HP) | Anti-Symmetric | 2 | ±Y |
| Fifth profile (VP) | Anti-Symmetric | 2 | ±X |
| Fifth profile (SP) | Anti-Symmetric | 4 | ±X, ±Y |

FIG. 16 is an exemplary flow diagram illustrating a computer implemented method 700 for real time beam steering by CRIS in accordance with some embodiments of the present disclosure. The steps of the method 700 will now be explained in detail with reference to the components of the system 100 of FIG. 1. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the method 700 comprises, placing, at step 702, a composite reconfigurable intelligent surface (CRIS) 102 comprising a set of constituent reflecting surfaces (104[1, . . . , NM−1, NM]) in one of (i) a symmetric configuration, or (ii) an anti-symmetric configuration. The CRIS 102 controls one or more radio frequency (RF) signals propagated from an external source of radiation to facilitate transmission or reception of a desired RF signal amongst the one or more RF signals by a plurality of RF systems in an environment. Each constituent reflecting surface 104 is generated from an N*M array of a set of unit cells for reflecting the one or more RF signals in a desired direction. At step 704, a set of voltage control units (106[1, . . . , NM−1, NM]) is connected to the CRIS 102 and configured for phase shifting the one or more RF signals. Each constituent reflecting surface 104 of the CRIS is connected to at least one voltage control unit 106 amongst the set of voltage control units (106[1, . . . , NM−1, NM]). Further at step 706, a set of pre-defined voltage profiles is obtained from the set of voltage control units (106[1, . . . , NM−1, NM]). The set of pre-defined voltage profiles programs phase one or more phase gradient values of the one or more RF signals using the set of voltage control units (106[1, . . . , NM−1, NM]) characterizing at least one of (i) real time beam steering control, (ii) multi-beam reflection, (iii) polarization sensitivity, (iv) two-dimensional beam (vii) combinations thereof, by exciting one or more constituent reflecting surfaces amongst the set of constituent reflecting surfaces (104[1, . . . , NM−1, NM]).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a composite reconfigurable intelligent surface, designed to deliver polarization sensitive, controlled, multi-beam reflection performance for n78 band of operations. The embodiments of the present system utilize constituent RIS tiles to generate a composite layout, to diversify its functionalities for practical use. The unit cell acts as the building block for such structures and is responsible to provide distinct individual phase reflection performance, utilizing the installed varactor diode component. The unit cell is then used to generate constituent reflecting surfaces which are further arranged to conceive the CRIS structures with robust performance attributes. The structure is capable to offer a) multi-beam reflection performance, b) polarization sensitive operation, c) 2D beam steering abilities, d) real-time beam control, e) null point reduction for beam shaping requirements and f) dependable pattern stability over a suitable range of frequencies.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A composite reconfigurable intelligent surface (CRIS) system for real time beam steering comprising:

a composite reconfigurable intelligent surface (CRIS) comprising a set of constituent reflecting surfaces placed in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment, wherein each constituent reflecting surface is generated from a pre-defined N*M array of a set of unit cells for reflecting the one or more RF signals in a desired direction;

a set of voltage control units connected to the CRIS and configured for phase shifting the one or more RF signals, wherein each constituent reflecting surface of the CRIS is connected to at least one voltage control unit amongst the set of voltage control units; and a controller unit in communication with the set of voltage control units, wherein the controller unit comprises:

one or more data storage devices (configured to store instructions;

one or more communication interfaces; and one or more hardware processors operatively coupled to the one or more data storage devices via the one or more communication interfaces, wherein the one or more hardware processors are configured to be operated by the instructions to:

obtain a set of pre-defined voltage profiles such that the set of pre-defined voltage profiles programs one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

2. The CRIS system of claim 1, wherein each unit cell comprises a Minkowski shaped fractal patch disposed on a first substrate layer of a two-layer substrate, with a metallic ground plane sandwiched between the first substrate layer and a second substrate layer.

3. The CRIS system of claim 2, wherein a narrow slit bisects the Minkowski shaped fractal patch to facilitate placement of a varactor diode.

4. The CRIS system of claim 2, wherein the Minkowski shaped fractal patch has a predefined width and a predefined breadth.

5. The CRIS system of claim 1, wherein the symmetric configuration of the CRIS enables a one-dimensional degree of freedom by tilting the reflected one or more RF signals along a horizontal direction, and wherein the anti-symmetric configuration of the CRIS enables a two-dimensional degree of freedom and polarization sensitivity by tilting the reflected one or more RF signals along (i) the horizontal direction, (ii) a vertical direction, or (iii) a combination thereof.

6. The CRIS system of claim 1, wherein the one or more phase gradient values of the one or more RF signals are programmed by biasing a set of varactor diodes of the set of unit cells using the set of pre-defined voltage profiles.

7. A processor implemented method further comprising:

placing a composite reconfigurable intelligent surface (CRIS) comprising a set of constituent reflecting surfaces in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment, wherein each constituent reflecting surface is generated from an N*M array of a set of unit cells for reflecting the one or more RF signals in a desired direction;

connecting a set of voltage control units to the CRIS and configuring for phase shifting the one or more RF signals, wherein each constituent reflecting surface of the CRIS is connected to at least one voltage control unit amongst the set of voltage control units; and obtaining a set of pre-defined voltage profiles such that the set of pre-defined voltage profiles programs one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

8. The processor implemented method of claim 7, wherein each unit cell comprises a Minkowski shaped fractal patch disposed on a first substrate layer of a two-layer substrate, with a ground plane sandwiched between the first substrate layer and a second substrate layer.

9. The processor implemented method of claim 8, wherein a narrow slit bisects the Minkowski shaped fractal patch to facilitate placement of a varactor diode.

10. The processor implemented method of claim 8, wherein the Minkowski shaped fractal patch has a predefined width and a predefined breadth.

11. The processor implemented method of claim 7, wherein the symmetric configuration of the CRIS enables a one-dimensional degree of freedom by tilting the reflected one or more RF signals along a horizontal direction, and wherein the anti-symmetric configuration of the CRIS enables a two-dimensional degree of freedom and polarization sensitivity by tilting the reflected one or more RF signals along (i) the horizontal direction, (ii) a vertical direction, or (iii) a combination thereof.

12. The processor implemented method of claim 7, wherein the one or more phase gradient values of the one or more RF signals are programmed by biasing a set of varactor diodes of the set of unit cells using the set of pre-defined voltage profiles.

13. One or more non-transitory machine-readable information storage mediums comprising one or more instructions which when executed by one or more hardware processors cause:

placing a composite reconfigurable intelligent surface (CRIS) further comprising a set of constituent reflecting surfaces in one of (i) a symmetric configuration, or (ii) an anti-symmetric configuration, controlling one or more radio frequency (RF) signals propagated from an external source of radiation to facilitate transmission or reception of a desired RF signal amongst the one or more RF signals by a plurality of RF systems in an environment, wherein each constituent reflecting surface is generated from an N*M array of a set of unit cells for reflecting the one or more RF signals in a desired direction;

connecting a set of voltage control units to the CRIS and configuring for phase shifting the one or more RF signals, wherein each constituent reflecting surface of the CRIS is connected to at least one voltage control unit amongst the set of voltage control units; and obtaining a set of pre-defined voltage profiles such that the set of pre-defined voltage profiles programs one or more phase gradient values of the one or more RF signals using the set of voltage control units characterizing at least one of (i) real time beam steering control, (ii) multi-beam reflection, (iii) polarization sensitivity, (iv) two-dimensional beam steering, (v) null point reduction for beam shaping, (vi) beam pattern stability or (vii) combinations thereof, by exciting one or more constituent reflecting surfaces amongst the set of constituent reflecting surfaces.

14. The one or more non-transitory machine-readable information storage mediums of claim 13, wherein each unit cell comprises a Minkowski shaped fractal patch disposed on a first substrate layer of a two-layer substrate, with a ground plane sandwiched between the first substrate layer and a second substrate layer.

15. The one or more non-transitory machine-readable information storage mediums of claim 14, wherein a narrow slit bisects the Minkowski shaped fractal patch to facilitate placement of a varactor diode.

16. The one or more non-transitory machine-readable information storage mediums of claim 14, wherein the Minkowski shaped fractal patch has a predefined width and a predefined breadth.

17. The one or more non-transitory machine-readable information storage mediums of claim 13, wherein the symmetric configuration of the CRIS enables a one-dimensional degree of freedom by tilting the reflected one or more RF signals along a horizontal direction, and wherein the anti-symmetric configuration of the CRIS enables a two-dimensional degree of freedom and polarization sensitivity by tilting the reflected one or more RF signals along (i) the horizontal direction, (ii) a vertical direction, or (iii) a combination thereof.

18. The one or more non-transitory machine-readable information storage mediums of claim 13, wherein the one or more phase gradient values of the one or more RF signals are programmed by biasing a set of varactor diodes of the set of unit cells using the set of pre-defined voltage profiles.

\* \* \* \* \*